United States Patent
Frassi et al.

(10) Patent No.: US 6,182,476 B1
(45) Date of Patent: Feb. 6, 2001

(54) WARP KNITTING LOOM, IN PARTICULAR CROCHET GALLOON MACHINE

(75) Inventors: Fiorenzo Frassi, Varedo; Maria Pierpaolo Destri, Cinisello Balsamo, both of (IT)

(73) Assignee: Textilma AG, Hergiswil (CH)

( * ) Notice: Under 35 U.S.C. 154(b), the term of this patent shall be extended for 0 days.

(21) Appl. No.: 09/445,312

(22) PCT Filed: Jun. 12, 1998

(86) PCT No.: PCT/CH98/00244

§ 371 Date: Jan. 21, 2000

§ 102(e) Date: Jan. 21, 2000

(87) PCT Pub. No.: WO99/01600

PCT Pub. Date: Jan. 14, 1999

(30) Foreign Application Priority Data

Jul. 4, 1997 (CH) ............................................ 1637/97

(51) Int. Cl.⁷ .................................................. D04B 25/00
(52) U.S. Cl. ................................................. 66/207; 66/204
(58) Field of Search .......................... 66/203, 204, 205, 66/206, 207, 208

(56) References Cited

U.S. PATENT DOCUMENTS 4,196,456  4/1980  Manzke et al.

5,295,372 * 3/1994 Kemper et al. ............................ 66/207
5,327,750 * 7/1994 Speich ..................................... 66/207
5,775,134 * 7/1998 Otobe et al. ............................. 66/204

FOREIGN PATENT DOCUMENTS

| 2 119 053 | 12/1972 | (DE) . |
| 2 257 224 | 5/1974 | (DE) . |
| 31 27 542 | 7/1982 | (DE) . |
| 41 27 344 | 2/1993 | (DE) . |
| 44 12 213 | 10/1994 | (DE) . |
| 197 00 392 | 7/1997 | (DE) . |
| 0 347 626 | 12/1989 | (EP) . |
| 0 461 524 | 12/1991 | (EP) . |
| 0 747 125 | 2/1997 | (EP) . |
| WO 81/01223 | 4/1981 | (WO) . |
| WO 92/13127 | 8/1992 | (WO) . |

* cited by examiner

*Primary Examiner*—Danny Worrell
(74) *Attorney, Agent, or Firm*—Brown, Martin, Haller & McClain, LLP

(57) ABSTRACT

The invention relates to a warp knitting loom with individually driven guide bars that are controlled by a control device. A linear motor is used, resulting in a particularly space-saving and flexible driving apparatus. This motor has at least two driving elements which are each connected to a guide bar and can move back and forth in a common stator with a closed magnetic circuit. Each driving element has at least one drive coil which is connected to the control device and whose winding plane is transversal to the magnetic flux.

11 Claims, 2 Drawing Sheets

WARP KNITTING LOOM, IN PARTICULAR CROCHET GALLOON MACHINE

TECHNICAL FIELD

The invention relates to a warp knitting machine, especially a crochet galloon machine, according to the precharacterizing clause of claim 1.

PRIOR ART

Many warp knitting machines of the type mentioned in the introduction are known, as, for example, from WO 92/13127, in which guide bars can be driven individually by means of a summation gear, individual displacement elements having different degrees of displacement and being connected by means of coupling members to a regulating device which can be controlled according to the particular pattern. This drive is relatively complicated, and it is necessary to move relatively large masses which make the drive very sluggish and greatly limit the performance of warp knitting machines. Moreover, due to the number of displacement elements, intermediate elements and members for coupling to a pattern-related regulating device, the drive requires a considerable overall volume, this being a serious disadvantage because the guide bars have to be arranged near the knitting point and the space available for drive elements is greatly restricted correspondingly.

DE-A-21 19 053 discloses a device for shedding on weaving looms, in which the warp yarns are driven by means of a linear motor, drive members, which each move at least one warp yarn, being arranged in a common stator. It cannot be understood how such a linear motor could also be suitable for driving a guide bar of a warp knitting machine.

PRESENTATION OF THE INVENTION

The object of the invention is to improve further a warp knitting machine, especially a crochet galloon machine, of the type mentioned in the introduction.

The set object is achieved, according to the invention, by means of the characterizing features of claim 1.

Since an electronically controllable linear motor has at least two drive members which are connected in each case to a guide bar and which are guided to and fro in a common stator by means of a closed magnetic circuit, there being present, moreover, for each drive member at least one drive coil which is connected to the control device and the plane of turn of which is oriented transversely to the magnetic flux direction, this results, for the guide bars, in an extremely small and nevertheless effective drive which, moreover, can be controlled in a simple way by means of an electronic control device, so that it is possible for the drive to have a hitherto unknown small design. Accordingly, the masses and frictional forces are extremely low and the electronic control is direct and effective, so that high drive speeds are possible, along with very low wear, the least possible generation of noise and the most minimal energy consumption. Moreover, a high degree of control flexibility for pattern purposes is achieved.

Advantageous embodiments of the invention are described in claims 2 to 11.

In principle, it is possible to arrange the drive coil for driving the drive members on parts of the stator and to provide merely permanent magnets on the drive members. However, the embodiment according to claim 2 is more advantageous, since it allows a simpler, more effective and more individual control of the drive members.

The drive force can be increased if there is not only one drive coil present on the drive member, but two or more drive coils arranged one behind the other in the direction of movement.

An especially advantageous embodiment of the stator is described in claim 4, the development according to claim 5 being especially preferred.

The magnets of the stator may be electrical exciting magnets, but they are preferably designed, according to claim 6, as permanent magnets.

An embodiment according to claim 7 is especially advantageous, since it can then be seen which position the drive member assumes in each case, so that it is not necessary to operate with a constant stroke up against limit stops, but, instead, the control device can also instigate the position into which the drive member is to be moved. Particularly by means of the development of the warp knitting machine according to claim 8, it is possible for the drive member to be controlled exactly as regards the magnitude of the displacement travel and the stopping position, with the result that optimum patterning of the warp knit fabric to be produced is possible.

In principle, it is conceivable for the drive member according to claim 10 to execute a curved to-and-fro movement, but the embodiment according to claim 9 is especially advantageous.

A development according to claim 11 is advantageous. The cooling device may, for example, be a suction blower which sucks away hot air and therefore also serves, at the same time, for cleaning the linear motor. However, more intensive cooling is achieved if the cooling device is designed for the supply of cooling air.

BRIEF DESCRIPTION OF THE DRAWINGS

Exemplary embodiments of the invention are described in more detail below with reference to diagrammatic drawings in which.

WAYS OF IMPLEMENTING THE INVENTION

Figure 1:
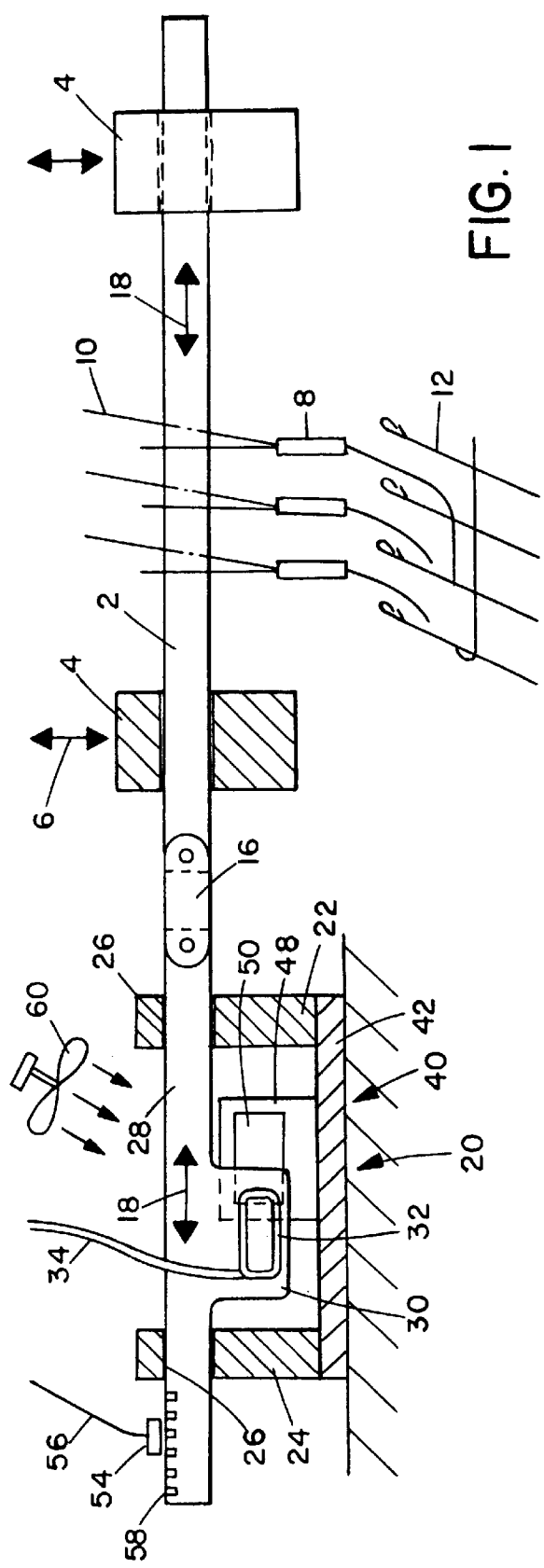
FIG. 1 shows the guide bar of a warp knitting machine with a linear motor in a view of the longitudinal side of the guide bar.

FIG. 1 shows a guide bar 2 of a warp knitting machine in a diagrammatic illustration and to the extent necessary for the present invention, since large numbers of warp knitting machines and especially crochet galloon machines are known.

The guide bar 2 is mounted displaceably in the longitudinal direction in bearings 4, the bearings themselves being capable of executing, depending on the mode of execution, an optional up-and-down movement according to the arrow 6, so that a yarn 10 is inserted into knitting needles 12 by means of yarn guides 8. A linear motor 14 is connected via a coupling member 16 to the guide bar 2 and imparts a to-and-fro movement 18 to the latter.

Figure 2:
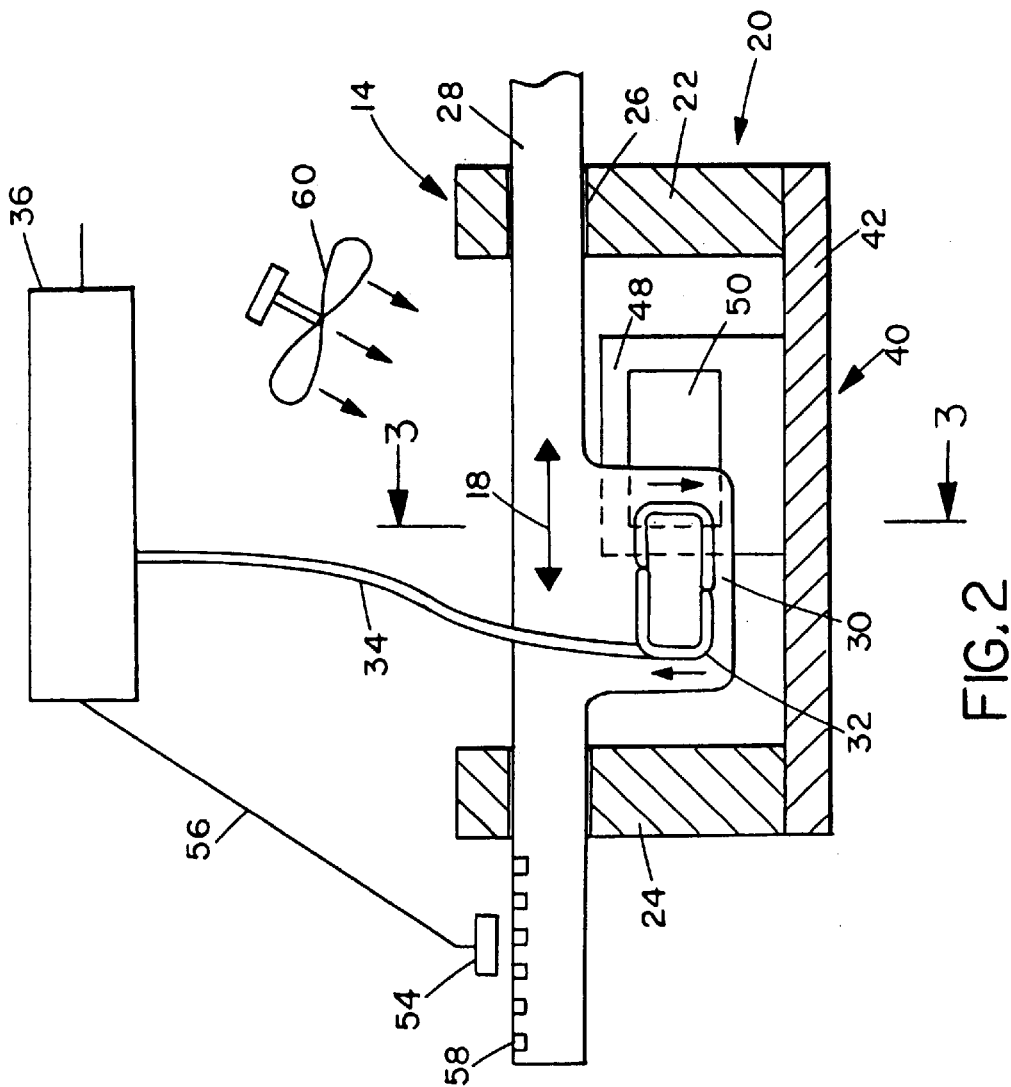
FIG. 2 shows the linear motor of FIG. 1 in the section II—II of FIG. 3.
Figure 3:
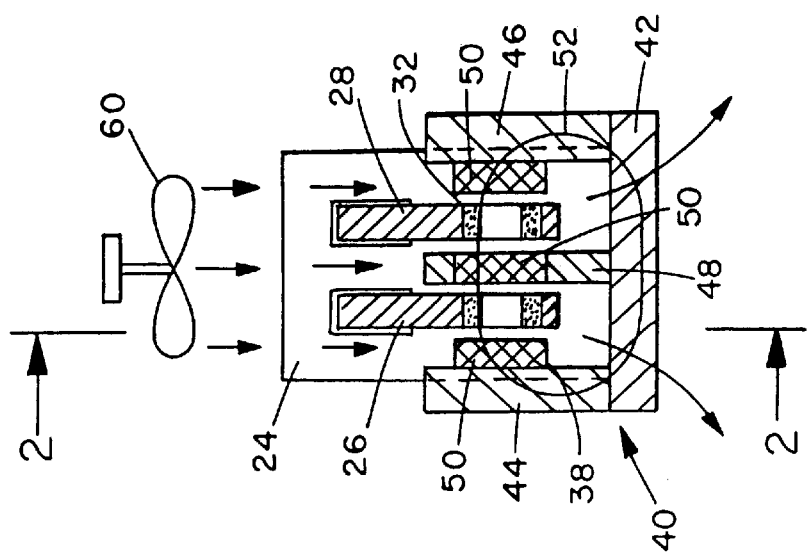
FIG. 3 shows the linear motor in the section III—III of FIG. 2.

The linear motor, illustrated in more detail in FIGS. 2 and 3, contains a stator 20, on which are arranged a front bearing block 22 and a rear bearing block 24 which guide a drive member 28 displaceably to and fro in bearings 26, said drive member being connected to the guide bar 2 by means of the coupling member 16. The drive member 28 is provided with a widened portion 30 which runs downwards and in which is arranged a drive coil 32 connected to a control device 36 via leads 34. This widened portion 30 engages to and fro into a slot 38 of the stator 20 which contains a core 40 made of magnetically conductive material. This core is formed by a base part 42, on which project end parts 44, 46, between which are arranged one or more intermediate parts 48 which form the slots 38. Fastened to the end parts 44, 46 and to the intermediate part 48 are magnets 50 which are preferably permanent magnets and which, together with the core, produce a peripherally closed magnetic circuit 52, in which the field lines running from north to south run, on the one hand, between the magnets and therefore also between the drive coils 32 arranged in the slots and are closed via the end parts and the base part. So as not to disturb this magnetic circuit, the intermediate parts 48 carrying the magnet 50 consist of magnetically non-conductive material. In the present example, the linear motor has an intermediate part 48 which subdivides the region between the end parts 44 and 46 into two slots 38, in each of which a drive member 28 is arranged. The arrangement may also readily be such that a larger number of slots and drive members 28 may be provided.

The linear motor is designed, further, in such a way that it co-operates with a sensor 54 for recognizing the position of the drive member 28, the said sensor being connected to the control device 36 via a lead 56. For recognizing the position, position markers 58 are arranged on the drive member 28 or on another member, such as, for example, the guide bar, connected to the drive member, so that it is possible, via the control device 36, to detect the position in which the drive member 28 is located. The linear motor is equipped, further, with a cooling device 60 in the form of a blower which blows cooling air over and through the linear motor. Cooling with oil is also possible.

The linear motor is driven to and fro in alternating directions and braked by means of a pulsed current, the frequency of the pulsed current determining the drive speed. The control device is, then, designed in such a way that, by means of corresponding analog or digital software, it can move the drive member up to a predeterminable position and also hold it in this position. It is consequently possible, for example in conformity with the pattern to be produced, to control the drive member 28 on the guide bars in different sequences of movement and amounts of movement according to the particular pattern. The drive may be controlled in various ways known per se.

In control according to the difference or absolute method, the travel is compared with an absolute reference quantity. The control always knows the position in which the drive member is located. Even after the warp knitting machine has been switched off and restarted, it is possible to run on from the respective position of the drive member.

In the incremental method, the increase in travel is used as measurement quantity, and, whenever the warp knitting machine is restarted, the drive member has to be started up from a zero or basic position determined by a stop.

Figure 4:
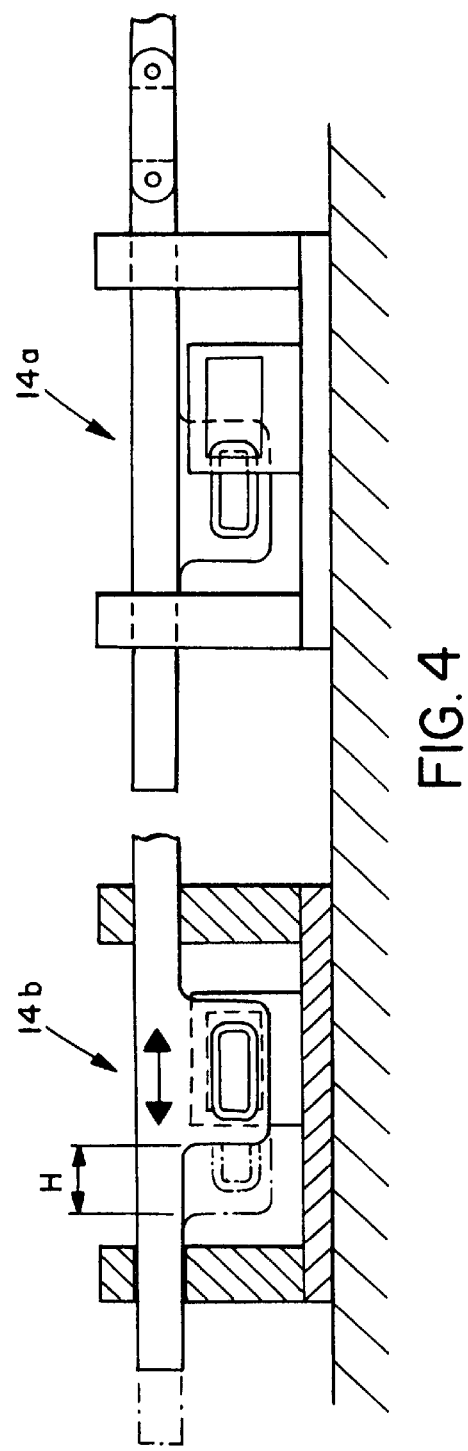
FIG. 4 shows the arrangement of two linear motors.

FIG. 4 shows that a plurality of linear motors may be arranged in a warp knitting machine, which each drive a plurality of, for example, 10 guide bars. In the example of FIG. 4, a front linear motor 14*a* is followed by a rearwardly offset second linear motor 14*b*, the linear motors in each case executing the variable stroke H.

LIST OF REFERENCE SYMBOLS

H stroke
2 guide bar
4 bearing
6 movement
8 yarn guide
10 yarn
12 knitting needle
14 linear motor
14*a* front linear motor
14*b* rear linear motor
16 coupling member
18 movement
20 stator
22 front bearing block
24 rear bearing block
26 bearing
28 drive member
30 widened portion
32 drive coil
34 lead
36 control device
38 slot
40 core
42 base part
44 end part
46 end part
48 intermediate parts
50 magnets
52 magnetic circuit
54 sensor
56 lead
58 position marker
60 cooling device

What is claimed is:

1. A warp knitting machine, comprising:
    at least two individually driven guide bars each moveable back and forth in a predetermined direction of movement;
    an electronically controllable linear motor having at least two drive members, each drive member being connected to a respective guide bar, and a common stator having a closed magnetic circuit for guiding the drive members back and forth, the magnetic circuit defining a magnetic flux direction;
    at least two drive coils located in said stator, each drive coil being associated with a respective one of said drive members, the drive coils each having a plane of turn oriented transversely to the magnetic flux direction; and
    a control device for controlling movement of said guide bars, the control device being connected to said drive coils to control said guide bar movement.

2. The machine as claimed in claim 1, wherein each drive coil is arranged on the respective drive member.

3. The machine as claimed in claim 1, wherein each drive member has two drive coils arranged one behind the other in the direction of movement of the drive member and respective guide bar.

4. The machine as claimed in claim 1, wherein the stator has a core of magnetically conductive material, and at least two slots, each drive member being arranged to extend transversely through a respective slot, and each slot having a magnet on each side of the respective drive member extending through the slot, whereby the magnets and core form a peripherally closed magnetic circuit.

5. The machine as claimed in claim 4, wherein the core comprises a base part, two end parts which project transversely from the base part, and at least one intermediate part projecting from the base part between the end parts, the end parts and intermediate part forming the slots and the intermediate part being of magnetically non-conductive material.

6. The machine as claimed in claim 4, wherein the magnets are permanent magnets.

7. The machine as claimed in claim 1, including a sensor assigned to each drive member for position recognition, the sensors being connected to the control device.

8. The machine as claimed in claim 1, wherein said control device controls each drive member individually to move into any desired position.

9. The machine as claimed in claim 1, including guide means for guiding said drive members for movement to and fro in a straight line.

10. The machine as claimed in claim 1, wherein each drive member is guided to and fro in an arc-shape.

11. The machine as claimed in claim 1, including a cooling device for supplying a cooling medium to said linear motor.

* * * * *